US012575552B2

(12) United States Patent
Frigo et al.

(10) Patent No.: US 12,575,552 B2
(45) Date of Patent: Mar. 17, 2026

(54) PLANT AND METHOD FOR ANTIPARASITIC TREATMENT OF CROPS OR SPACES

(71) Applicant: Team Energy Technologies S.r.L., Padua (IT)

(72) Inventors: Flavio Frigo, Montecchio Maggiore (IT); Alessandro Longo, Comuda (IT); Patrizio Marcon, Caerano di San Marco (IT)

(73) Assignee: Team Energy Technologies, S.r.L., Padua (IT)

( * ) Notice: Subject to any disclaimer, the term of this patent is extended or adjusted under 35 U.S.C. 154(b) by 31 days.

(21) Appl. No.: 18/567,799

(22) PCT Filed: May 26, 2022

(86) PCT No.: PCT/EP2022/064369
§ 371 (c)(1),
(2) Date: Dec. 7, 2023

(87) PCT Pub. No.: WO2022/258392
PCT Pub. Date: Dec. 15, 2022

(65) Prior Publication Data
US 2024/0268365 A1 Aug. 15, 2024

(51) Int. Cl.
*A01M 1/22* (2006.01)

(52) U.S. Cl.
CPC ................................... *A01M 1/226* (2013.01)

(58) Field of Classification Search
CPC ...................................................... A01M 1/226
See application file for complete search history.

(56) References Cited

U.S. PATENT DOCUMENTS

| | | | | |
|---|---|---|---|---|
| 5,575,106 | A * | 11/1996 | Martin .................... | A01M 1/20 |
| | | | | 43/132.1 |
| 5,896,696 | A * | 4/1999 | Stokes .................... | A01M 3/00 |
| | | | | 43/124 |
| 6,250,255 | B1 | 6/2001 | Lenhardt et al. | |
| 2003/0215354 | A1* | 11/2003 | Clark ........................ | A61L 2/00 |
| | | | | 422/22 |
| 2006/0024195 | A1* | 2/2006 | Lagunas-Solar .......... | A61L 2/08 |
| | | | | 422/22 |

(Continued)

FOREIGN PATENT DOCUMENTS

WO        2018096542 A1      5/2018

*Primary Examiner* — Joshua J Michener
*Assistant Examiner* — Henry Hooper Mudd
(74) *Attorney, Agent, or Firm* — Patterson Intellectual Property Law, PC

(57) ABSTRACT

The invention relates to a plant (100) for antiparasitic treatment of crops or spaces comprising an emitter (10) of electromagnetic signals and an electronic control unit (40), to which the emitter (10) is operatively connected. The electronic control unit is configured to control the emitter so that it emits, in succession or simultaneously, a plurality of cycles of electromagnetic signals, said electromagnetic signals having a selectable frequency, cycle by cycle, based on the type of crop or space to be treated or the parasite to be defeated. The invention also relates to a method for antiparasitic treatment of crops or spaces conducted using the plant (100) as defined above.

20 Claims, 4 Drawing Sheets

(56) References Cited

U.S. PATENT DOCUMENTS

| | | | |
|---|---|---|---|
| 2007/0068067 A1* | 3/2007 | Ragon | A01M 1/22 |
| | | | 43/132.1 |
| 2015/0101239 A1 | 4/2015 | Cohen | |
| 2015/0150237 A1* | 6/2015 | Valls | A01M 29/28 |
| | | | 29/28 |
| 2018/0116199 A1* | 5/2018 | Hartman | A01M 1/22 |
| | | | 1/226 |
| 2018/0132469 A1* | 5/2018 | Frudakis | A01M 1/20 |
| 2020/0068866 A1* | 3/2020 | Taylor | A01M 1/22 |
| | | | 1/226 |
| 2021/0289765 A1* | 9/2021 | Scofield | A01M 1/22 |
| | | | 1/226 |
| 2023/0232811 A1* | 7/2023 | Einat | A01M 1/22 |
| | | | 1/226 |

* cited by examiner

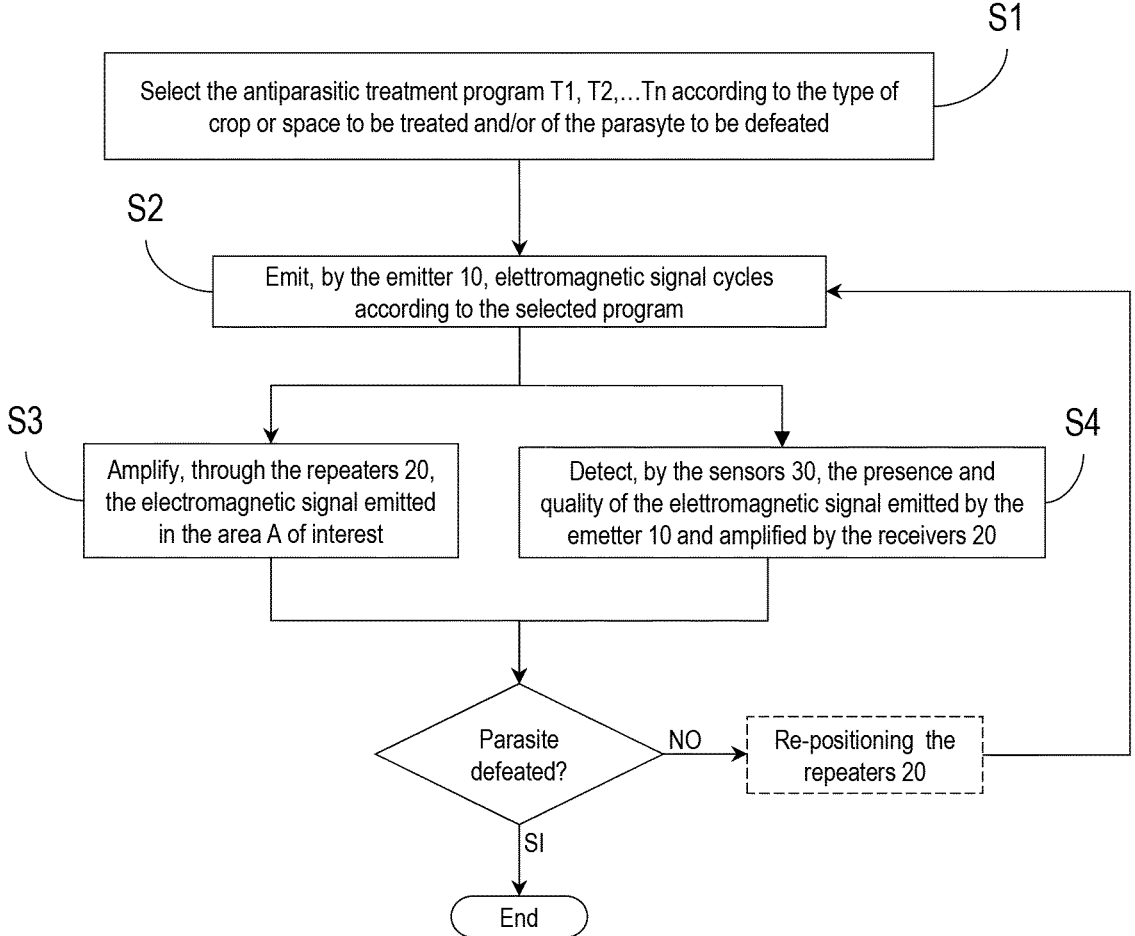

S1

Select the antiparasitic treatment program T1, T2,...Tn according to the type of crop or space to be treated and/or of the parasyte to be defeated

S2

Emit, by the emitter 10, elettromagnetic signal cycles according to the selected program

S3

Amplify, through the repeaters 20, the electromagnetic signal emitted in the area A of interest

S4

Detect, by the sensors 30, the presence and quality of the elettromagnetic signal emitted by the emitter 10 and amplified by the receivers 20

Parasite defeated?

NO

Re-positioning the repeaters 20

SI

End

FIG. 2

PLANT AND METHOD FOR ANTIPARASITIC TREATMENT OF CROPS OR SPACES

TECHNICAL FIELD OF THE INVENTION

The present invention refers to the technical field of antiparasitic treatments. More particularly, the present invention relates to a plant and a method for the antiparasitic treatment of crops, for example orchards, vineyards and the like, or open or closed spaces, for example fruit storage warehouses, domestic spaces, deposits, and the like.

BACKGROUND OF THE INVENTION

With particular reference to crops, since their first development, plants and fruits are subject to adversities of a parasitic nature, caused by living organisms, such as bacteria, moulds, mites, viruses, insects, fungi, etc.

The presence of parasites in a crop damages the crop, thus causing loss of production and income for the farmer.

To combat, prevent or treat infections caused by parasites on crops, plant protection products are typically used, also called pesticides, phytopharmaceuticals or crop protection products. Plant protection products are inorganic, natural and synthetic organic compounds, which, in relation to their target and mode of action, are divided into pesticides, such as bactericides, insecticides, acaricides, nematocides, molluscicides, rodenticides, and fungicides, herbicides, repellents, plant growth regulators, which modify the biological processes of plants, and modifiers, for example pheromone traps, which change the behaviour of harmful insects. Plant protection products can be used in agriculture both in open fields and in greenhouses.

However, the massive and continuous use of plant protection products has a number of drawbacks.

First of all, the intense use of plant protection products generates resistance phenomena in the parasites, as a result of which the parasites develop mechanisms of insensitivity or inactivation towards the products used to eradicate them. It is therefore a real selection, which allows the populations of parasites to reach high densities in a short time.

Furthermore, the prolonged use of plant protection products can cause toxicity phenomena on the micro-, meso- and macro-fauna. In particular, in recent years there has been a decrease in bees and other pollinating insects, and more generally in many vertebrates and invertebrates, natural enemies of the infesting species.

Plant protection products also impact the physical and chemical properties of the soil. Furthermore, some residues can contaminate surface and groundwater, with further dangerous effects on the entire ecosystem. In fact, once dispensed in crops, the plant protection products are partially absorbed by the plants through direct contact with the leaves, flowers and fruits. The portion of the product that is not absorbed is partly degraded by the UV rays of the sun and partly vaporized in the atmosphere and incorporated into the clouds, and then falls back onto the ground in the form of rain. In particular, the portion of product that returns in the form of rain penetrates the soil and partly reaches the roots of the crops and partly the aquifers, flowing into rivers and lakes.

From the above, it is understood how the massive use of pesticides in agriculture represents a threat not only for humans but for the entire ecosystem.

In an attempt to curb this problem, and reduce the risks deriving from the use of plant protection products, several Community Directives have been issued in recent years, which define a series of limits on the concentrations of plant protection products in fruit and vegetables, in cereals and also in products of animal origin.

Furthermore, the WHO (World Health Organization) warns against the use of plant protection products, as, in addition to being a source of countless food allergies, they are potentially carcinogenic for the respiratory system, the circulatory system and for the skin, exposed to the UV rays of the sun.

As an alternative to plant protection products, an organic farming system has been developed, which consists of a type of agriculture that exploits the natural fertility of the soil, favouring it with limited interventions, excluding the use of synthetic products and genetically modified organisms (GMO). This organic farming system is, however, disadvantageous as it requires large manual interventions and high management costs.

Other systems for the antiparasitic treatment of crops or spaces include ultrasound systems, UV light systems, aroma emission systems, micro-vibration emission systems and endotherapy systems.

The ultrasonic antiparasitic treatment systems can be used as presence sensors in the areas of a crop to be dispensed with plant protection products, to improve the distribution of plant protection products, thus limiting the dispersion thereof into the environment. Alternatively or in addition, ultrasonic antiparasitic treatment systems can be used to emit ultrasonic waves, such as to disturb certain families of parasites. The latter application, however, has proved to be ineffective.

The UV light antiparasitic treatment systems emit light pulses such as to disturb the parasites present in crops or attract them into traps.

Aroma systems are based on the dispersion, in crops, of natural active ingredients capable of creating sexual confusion in parasite pheromones.

Micro-vibration emission systems rely on the emission of vibrational waves similar to those emitted by a female parasite to attract a male parasite to itself in order to create sexual confusion. In fact, the male parasite no longer finds the female with consequent limitation of the reproductive capacity.

Endotherapy systems are based on the principle according to which, by introducing a substance characterized by systemic properties directly into the trunk of a plant, the substance is redistributed in the crown of the plant through the vascular tissue.

However, each of the aforementioned known antiparasitic treatment systems has some drawbacks.

Ultrasonic antiparasitic treatment systems are harmful to human health and cause environmental damage. They are also expensive, applicable to a few types of parasites and have limited results.

Antiparasitic treatment systems with UV light, aromas and micro-vibrations are expensive, applicable to a few types of parasites and achieve limited results.

Finally, although endotherapy antiparasitic treatment systems can represent a solution for the control of some parasites in an urban environment, they are also very expensive and difficult to apply because the plant does not always accept the introduction of liquids into its vascular tissue.

SUMMARY OF THE INVENTION

The main object of the present invention is therefore to provide a plant and a method for the antiparasitic treatment of crops or spaces, configured to be non-invasive for the ecosystem nor dangerous for human and animal health, and therefore completely eco-friendly.

Another object of the present invention is to provide a plant and a method for the antiparasitic treatment of crops or spaces, configured to be operational over an entire day and in the presence of any weather conditions.

Another object of the present invention is to provide a plant for the antiparasitic treatment plant of crops or spaces, which is simple to use and requires minimal maintenance.

Another object of the present invention is to provide a plant and a method for antiparasitic treatment of crops or spaces, which are effective against a large number of parasites.

Yet another object of the present invention is to provide a plant and a method for antiparasitic treatment of crops or spaces, capable of selectively acting against parasites harmful to a particular crop or space, without therefore impacting useful insects, such as for example bees or ladybugs.

Last but not least, an object of the present invention is to provide a plant for antiparasitic treatment of crops or spaces, which has competitive construction and operating costs.

These and other objects, which will become apparent in the remainder of the present description, are achieved by an antiparasitic plant and method according to the independent claims 1 and 13. Preferred features of the plant and of the method of the invention are reported in the dependent claims.

In a first aspect thereof, the invention therefore relates to a plant for antiparasitic treatment of crops or spaces comprising:

an emitter of electromagnetic signals; and an electronic control unit, to which the aforementioned emitter is operatively connected. Such electronic control unit is configured to control the emitter. On the basis of the control signals received from the electronic control unit, the emitter emits, in succession or simultaneously, a plurality of cycles of electromagnetic signals having at least a selectable frequency, cycle by cycle, according to the type of crop or space to be treated or the parasite to be defeated.

By virtue of this combination of features, in particular by virtue of the use of frequency-selectable electromagnetic signal cycles, it is possible to emit, depending on the parasite to be defeated, electromagnetic signals capable of degenerating the molecular structure of the parasite and therefore preventing its proliferation in crops or spaces, while safeguarding the surrounding environment.

The use of electromagnetic signals for antiparasitic treatment advantageously allows production costs to be reduced, eliminating expenses for the purchase of plant protection products, machinery and equipment to spray crops or sanitize the spaces.

Furthermore, by virtue of the total absence of poisons, the antiparasitic treatment plant and method according to the invention do not pollute the environment or alter the ecosystem and human or animal health is completely safeguarded.

Furthermore, the electromagnetic signals, by virtue of their nature, are also able to act under the vegetation, in the ground or inside the plants, which advantageously increases the efficiency of the antiparasitic treatment.

Finally, by virtue of the use of electromagnetic signals, instead of phytosanitary products, the plant for antiparasitic treatment according to the invention advantageously does not require chemical and disinfestation interventions in crops or in spaces infested by parasites after treatment, interventions potentially harmful to operators and the environment.

Preferably, the above cycles of electromagnetic signals have a duration which is selectable based on the type of crop or space to be treated or the parasite to be defeated.

In an embodiment, the above cycles of electromagnetic signals are separated by a time interval with selectable duration based on the type of crop or space to be treated or the parasite to be defeated.

In an embodiment, the frequency of the electromagnetic signals emitted by the emitter is variable from 50 KHz to 25,000 KHz, preferably from 50 KHz to 3,000 KHz.

In an embodiment, the electromagnetic signals emitted by the emitter have a maximum amplitude equal to about 9 Vol.

In an embodiment, the emitter generates an electric field of 60 V/m and a magnetic field of 0.25 μT.

In an embodiment, the electromagnetic signals emitted by the emitter are electromagnetic waves having an impulsive waveform, for example square waves, preferably with a positive offset.

In an embodiment, the plant may comprise at least a repeater operatively connected to the electronic control unit and positioned inside an area of the crop or space to be treated. The above at least a repeater is able to receive and amplify the electromagnetic signals emitted by the emitter.

In an embodiment, the plant further comprising at least a sensor of electromagnetic signals, operatively connected to the electronic control unit and configured to detect the presence of electromagnetic signals. The at least a sensor is able to transmit to the electronic control unit at least a feedback signal, indicative of the electromagnetic signals emitted by the emitter.

In an embodiment, the at least a sensor of electromagnetic signals is positioned in proximity to a perimeter of the crop or space to be treated.

In an embodiment, the electronic control unit comprises a memory, in which at least a antiparasitic treatment program is stored, each program including operative parameters such as treatment start and end time, frequency(ies) of the electromagnetic signal to be emitted, number of electromagnetic signals to be emitted, duration of each electromagnetic signal and time interval between successive electromagnetic signals.

In an embodiment, the electronic control unit is controllable by a remote control device, for example a smartphone provided with an application or a tablet, a laptop or a dedicated device provided with a computer program, through which a user of the plant can select a treatment program associated with the crop or space to be treated or the parasite to be defeated.

In a second aspect thereof, the invention relates to an method for antiparasitic treatment of crops or spaces conducted using a plant as defined above, the method comprising the steps of:

selecting, via the electronic control unit or, possibly, the remote control device, an antiparasitic treatment program based on the type of crop or space to be treated or the parasite to be defeated;

emitting, by the emitter, a plurality of cycles of electromagnetic signals, in succession or simultaneously, the electromagnetic signals having at least a selectable frequency based on the selected antiparasitic treatment program; and if necessary, amplifying, by the at least a repeater, the electromagnetic signals emitted by the emitter.

In an embodiment, the method comprises a further step of detecting, by means of at least a sensor of electromagnetic signal, the presence and the quality of the electromagnetic signals emitted by the emitter and possibly amplified by the repeaters.

In an embodiment, the frequency of the electromagnetic signals emitted by the emitter and amplified by the repeaters is variable from 50 KHz to 25,000 KHz, preferably from 50 KHz to 3,000 KHz.

BRIEF DESCRIPTION OF THE DRAWINGS

Further features and advantages of the present invention will appear more clearly from the following detailed description of preferred embodiments thereof, made hereinafter by way of a non-limiting example only with reference to the accompanying drawings. In the drawings:

FIG. 2 is a flow chart of the various steps of the method for antiparasitic treatment of crops or spaces according to the present invention;

DETAILED DESCRIPTION OF THE INVENTION

Figure 1:
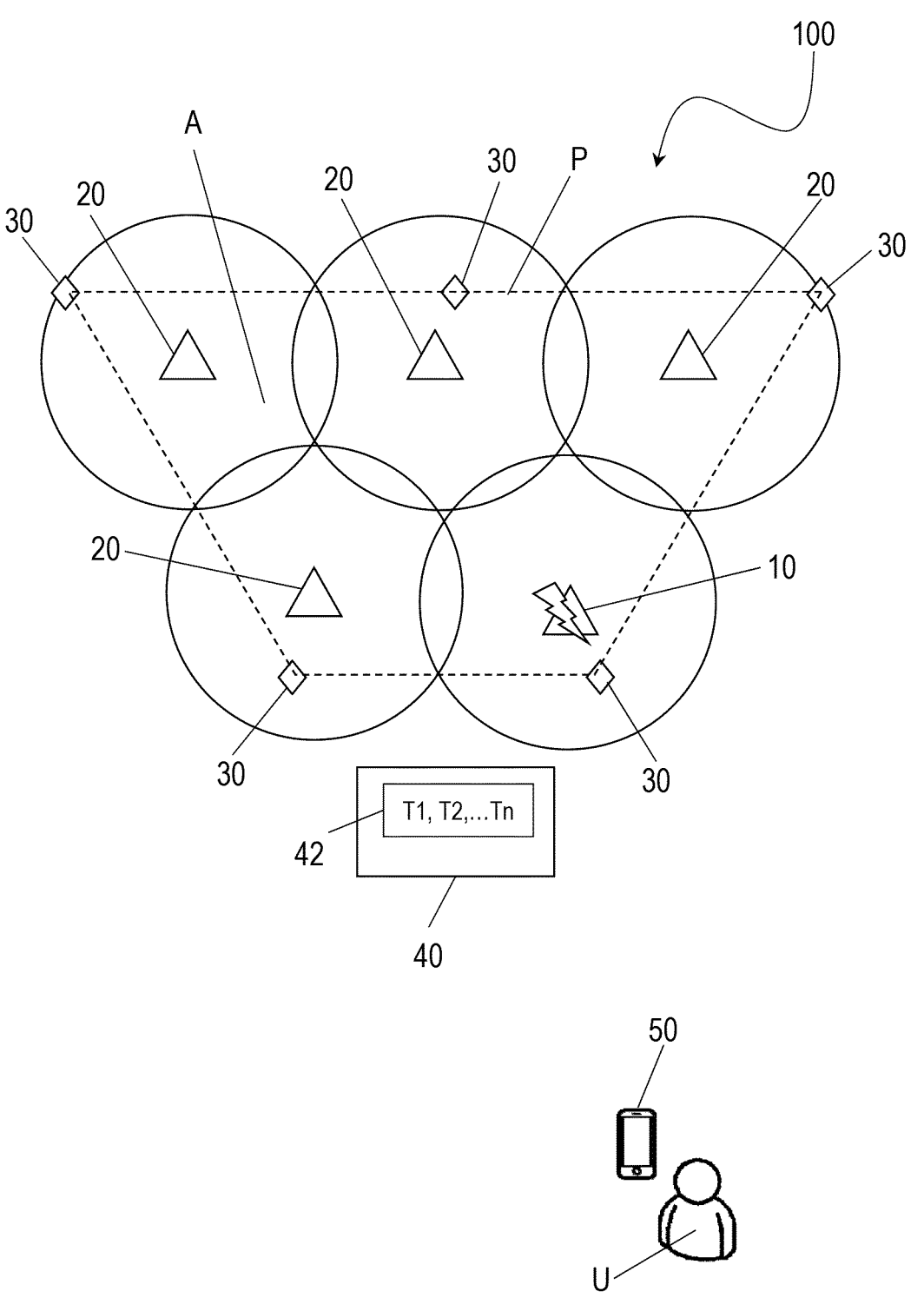
FIG. 1 is a schematic view of a plant for antiparasitic treatment of crops or spaces according to a preferred embodiment of the invention.
Figure 3:
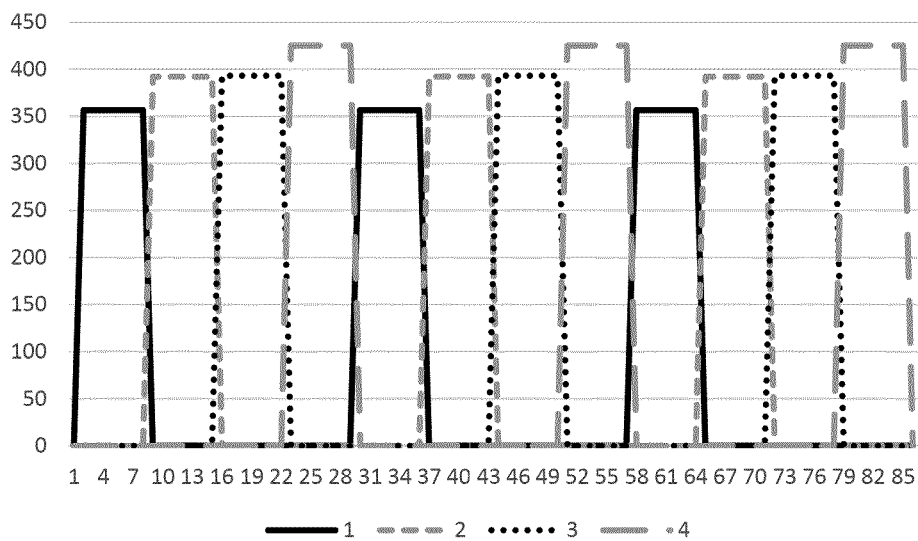
FIG. 3 is a graph illustrating the cycle of electromagnetic signals applied to three samples of *Escherichia Coli* in a first experimental example of antiparasitic treatment.
Figure 4:
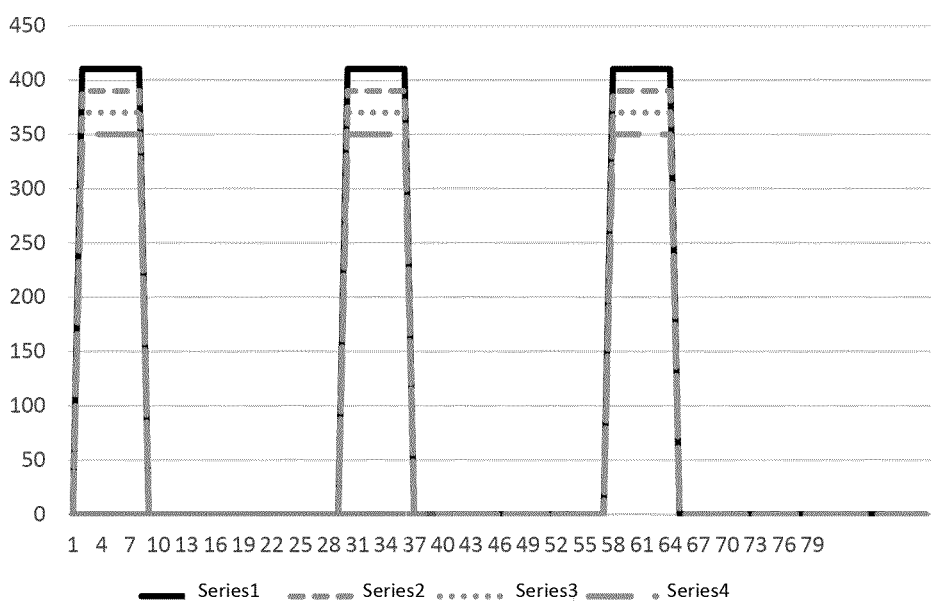
FIG. 4 is a graph illustrating the cycles of electromagnetic signals applied to three samples of *Escherichia Coli* in a second experimental example of antiparasitic treatment.

With reference to FIG. 1, a plant for antiparasitic treatment for crops or spaces according to a preferred embodiment of the present invention is illustrated.

The plant, generally indicated with the reference numeral 100, comprises an emitter 10 of electromagnetic signals.

Preferably, the plant 100 comprises at least a repeater 20, more preferably a plurality of repeaters 20 suitably distributed within an area A of the crop or space to be treated and configured to receive and amplify the electromagnetic signals emitted by the emitter 10.

The electromagnetic signals emitted by the emitter 10, possibly amplified by the repeaters 20, have a frequency ranging from 50 KHz to 25,000 KHz, more preferably from 50 KHz to 3,000 KHz. It has in fact been observed that frequencies between 50 KHz to 330 KHz allow for the eradication of moulds, frequencies from 300 KHz to 530 KHz allow for the eradication of bacteria and viruses, frequencies from 500 KHz to 980 KHz allow for the eradication of mites, frequencies from 850 KHz to 1,500 KHz allow for the eradication of insects and frequencies from 1,200 KHz to 9,000 KHz allow for the eradication of small animals, such as rodents. This is due to the fact that electromagnetic signals having the particular frequencies indicated above are able to degenerate the molecular structure of the particular parasite and therefore prevent the proliferation thereof, creating a resonance effect in the RNA bond of its cells.

The electromagnetic signals emitted by the emitter 10 are advantageously not perceived by humans and are far from the electromagnetic signals which are dangerous for the integrity of the animals. In fact, human audible frequencies range from 20 Hz to 25,000 Hz (20 KHz), while, for example, those audible to a cat range from 50 Hz to 30,000 Hz (30 KHz).

The electromagnetic signals preferably have a maximum amplitude equal to 9 Volts.

Preferably, the emitter 10 generates an electric field of 60 V/m and a magnetic field of 0.25 μT. Preferably, the above cycles of electromagnetic signals have a duration which is selectable based on the type of crop or space to be treated or the parasite to be defeated.

In some cases, the above cycles of electromagnetic signals are separated by a time interval with selectable duration based on the type of crop or space to be treated or the parasite to be defeated. Preferably, the electromagnetic signals are impulsive electromagnetic waves (square waves), more preferably with a positive offset.

The emitter 10 and, optionally, the repeaters 20 are operatively connected to an electronic control unit 40 (for example a computer), preferably provided with a memory 42, inside which one or more programs T1, T2, . . . , Tn of antiparasitic treatment are stored. In particular, each treatment program T1, T2, . . . , Tn is associated with the crop (for example a vineyard) or space (for example an apple storage warehouse) to be treated or with the parasite to be eradicated and includes the following operational parameters: time start and end of the treatment, frequency(ies) of the electromagnetic signal to be emitted, number of electromagnetic signals to be emitted, duration of each electromagnetic signal and time interval between successive electromagnetic signals.

Preferably, the plant 100 further comprises one or more sensors 30 of electromagnetic waves, which are suitably distributed in the crop or space to be treated, precisely in the vicinity of one of a perimeter P thereof.

The sensors of electromagnetic waves 30 are operatively connected to the electronic control unit 40 and configured to detect the total coverage of the microbicidal electromagnetic signal within the area A to be treated. They therefore allow the correct functioning of the emitter 10 and of the repeaters 20 to be checked. The sensors of electromagnetic waves 30 are also configured to transmit a feedback signal to the electronic control unit 40.

Preferably, it is possible to provide a remote control device, for example a smartphone 50 provided with an application through which a user U can select a treatment program T1, T2, . . . , Tn associated with the crop or space to be treated or with the parasite to be defeated and control the electronic control unit 40 to activate the system components 100.

As an alternative to the smartphone 50, it is possible to use any other intelligent portable device suitable for the purpose, for example a tablet, a portable computer or a dedicated device, provided with a suitable computer program.

With reference to FIG. 2, a method for antiparasitic treatment of a crop or space conducted using the plant 100 described above and illustrated in FIG. 1 will now be described.

The method starts with a step S1, in which the user U, using the electronic control unit 40 or the remote control device 50 operatively connected to the electronic control unit 40, selects an antiparasitic treatment program T1, T2, . . . , Tn according to the crop or space to be treated or the parasite to be defeated. In particular, by selecting an antiparasitic treatment program, the user U selects, according to the crop or space to be treated or the parasite to be defeated, operative parameters such as treatment start and end time, frequency(ies) of the electromagnetic signal to be emitted,

TABLE 4

| Antiparasitic treatment | Cell concentrations ($\log_{10}$ CFU/mL) |
| --- | --- |
| absent | 8.72 ± 0.03 |
| present | 1.67 ± 0.16 |

Following treatment with the electromagnetic signals illustrated above, a significant slowdown in bacterial growth was therefore observed. In fact, the concentration of *E. coli* bacteria goes from 8.72±0.03 (log 10 CFU/mL), in the absence of antiparasitic treatment, to 1.67±0.16 (log 10 CFU/mL), in the presence of antiparasitic treatment.

Example 3

In the following example, three samples of *Erwinia Amylovora*, inserted in Petri plates, were subjected to three cycles of antiparasitic treatment. Each cycle included three electromagnetic signals having a frequency equal to each other and different from the frequency of the electromagnetic signals of the other two cycles.

Figure 5:
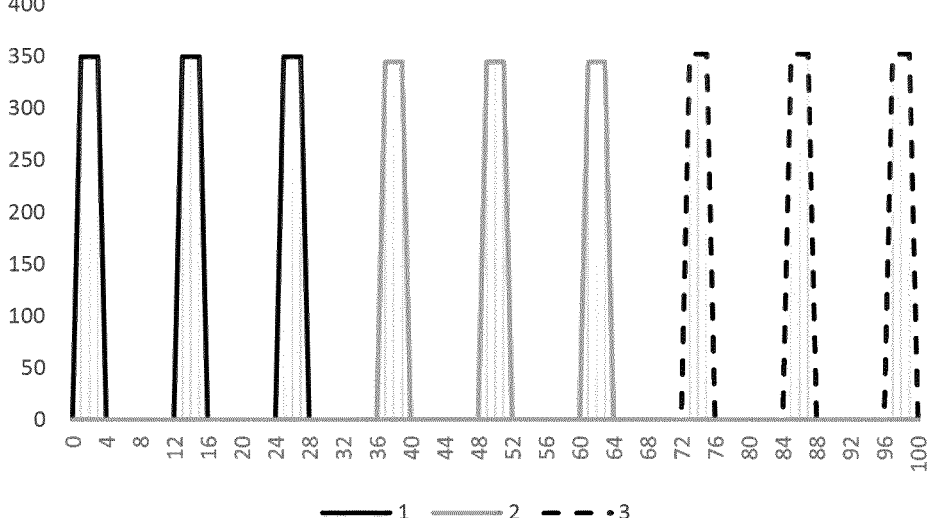
FIG. 5 is a graph illustrating the cycles of electromagnetic signals applied to three samples of *Erwinia Amylovora* in a third experimental example of antiparasitic treatment.

FIG. 5 graphically shows, for each cycle, the frequency, as a function of time, of the three electromagnetic signals that compose it. The treatment cycles were carried out at an environment temperature of about 20° C. The electromagnetic signals of each cycle had a duration of 3 minutes and were separated from each other by an interval of 9 minutes.

Table 5 below shows the above-mentioned operative parameters for each of the three treatment cycles.

TABLE 5

| Signal 1 | | Signal 2 | | Signal 3 | |
| --- | --- | --- | --- | --- | --- |
| start time | 11:25 | start time | 12:42 | start time | 13:44 |
| frequency | 350.000 KHz | frequency | 347.200 KHz | frequency | 352.100 KHz |
| duration | 3' | duration | 3' | duration | 3' |
| number of repetitions | 3 | number of repetitions | 3 | number of repetitions | 3 |
| end time | 12:01 | end time | 13:18 | end time | 14:20 |

Table 6 below shows the results obtained on the three samples in terms of cell concentration of bacteria, in the absence and in the presence of antiparasitic treatment.

TABLE 6

| Antiparasitic treatment | Cell concentrations ($\log_{10}$ CFU/mL) |
| --- | --- |
| absent | 9.82 ± 0.01 |
| present | 3.69 ± 0.03 |

Following treatment with electromagnetic signals, a slight, but not significant, slowdown in bacterial growth is therefore observed. In fact, the concentration of *Erwinia Amylovora* bacteria goes from 9.82±0.01 (log 10 CFU/mL), in the absence of antiparasitic treatment, to 3.69±0.03 (log 10 CFU/mL), in the presence of antiparasitic treatment.

The selectivity of the plant and of the method for anti-parasitic treatment of the present invention has also been demonstrated.

In particular, by placing together Petri dishes containing samples of *Escherichia coli* bacteria and Petri dishes containing samples of *Erwinia Amylovora* bacteria, and irradiating the Petri dishes with frequencies able to degrade

*Erwinia Amylovora* bacteria, these drastically reduced their bacterial growth capability, while *Escherichia coli* did not undergo any alteration.

The invention claimed is:

1. A system for antiparasitic treatment of crops or spaces, the system comprising:

an emitter of electromagnetic signals, wherein a frequency of the electromagnetic signals emitted by the emitter is variable from 50 KHz to 25,000 KHz; and an electronic control unit operatively connected to, and configured to control, the emitter of electromagnetic signals, wherein the emitter of electromagnetic signals is configured to emit, in succession or simultaneously, responsive to commands from the electronic control unit, a plurality of cycles of electromagnetic signals having at least a selected frequency, cycle by cycle, corresponding to a type of crop to be treated, or a parasite to be defeated, wherein the electronic control unit is configured to retrieve operative parameters for commanding the emitter of electromagnetic signals based on selection of a respective one of a plurality of antiparasitic treatment programs, the operative parameters corresponding to the selected program comprising one or more of: a treatment start and end time; a frequency or frequencies of the electromagnetic signal to be emitted; a number of electromagnetic signals to be emitted; a duration of each electromagnetic signal; and a time interval between successive electromagnetic signals.

2. The system of claim 1, wherein the cycles of electromagnetic signals have a duration which is selected based on the type of crop to be treated or the parasite to be defeated.

3. The system of claim 1, wherein subsequent or simultaneous cycles of electromagnetic signals are separate by a time interval with selected duration based on the type of crop to be treated or the parasite to be defeated.

4. The system of claim 1, wherein the emitter generates an electric field of 60 V/m and a magnetic field of 0.25 CT.

5. The system of claim 1, wherein the electromagnetic signals emitted by the emitter are electromagnetic waves having an impulsive waveform.

6. The system of claim 5, wherein the electromagnetic signals emitted by the emitter are electromagnetic waves having an impulsive waveform with a positive offset.

7. The system of claim 1, comprising a repeater operatively connected to the electronic control unit and positioned inside an area of the crop or space to be treated, wherein the repeater is configured to receive and amplify the electromagnetic signals emitted by the emitter.

8. The system of claim 1, comprising at least one sensor of electromagnetic signals operatively connected to the electronic control unit, wherein the at least one sensor is configured to detect a presence of electromagnetic signals and to transmit to the electronic control unit a feedback signal indicative of the electromagnetic signals emitted by the emitter.

9. The system of claim 8, wherein the at least one sensor comprises a plurality of sensors of electromagnetic signals positioned in a vicinity of a perimeter of the crop or space to be treated.

10. The claim of 1, wherein:

the electronic control unit is controllable by a remote control device; and the remote control device is configured to enable selection by a user of the antiparasitic treatment program associated with the crop to be treated or the parasite to be defeated.

11. A method for antiparasitic treatment of crops, the method comprising:

selecting, via an electronic control unit, one of a plurality of antiparasitic treatment programs based on a type of crop to be treated or a parasite to be defeated; and automatically retrieving operative parameters based on the selected one of the plurality of antiparasitic treatment programs, the operative parameters corresponding to the selected program comprising one or more of: a treatment start and end time; a frequency or frequencies of the electromagnetic signal to be emitted; a number of electromagnetic signals to be emitted; a duration of each electromagnetic signal; and a time interval between successive electromagnetic signals; and emitting by an emitter, responsive to commands from the electronic control unit, a plurality of cycles of electromagnetic signals, in succession or simultaneously, wherein the electromagnetic signals are generated with a frequency based on the selected antiparasitic treatment program, wherein the frequency of the electromagnetic signals emitted by the emitter is variable from 50 KHz to 25,000 KHz.

12. The method of claim 11, further comprising amplifying, via at least a repeater, the electromagnetic signals emitted by the emitter.

13. The method of claim 11, further comprising detecting, via at least one sensor of electromagnetic signals, a presence and a quality of the electromagnetic signals emitted by the emitter.

14. The method of claim 11, wherein the cycles of electromagnetic signals have a duration which is selected based on the type of crop or space to be treated or the parasite to be defeated.

15. The method of claim 11, wherein the subsequent or simultaneous cycles of electromagnetic signals are separated by a time interval with selected duration based on the type of crop to be treated or the parasite to be defeated.

16. The method of claim 11, wherein the emitter generates an electric field of 60 V/m and a magnetic field of 0.25 CT.

17. The method of claim 11, wherein the electromagnetic signals emitted by the emitter are electromagnetic waves having an impulsive waveform.

18. The method of claim 11, wherein the electromagnetic signals emitted by the emitter are electromagnetic waves having an impulsive waveform with a positive offset.

19. The system of claim 1, wherein the frequency of the electromagnetic signals emitted by the emitter is variable from 300 KHz to 25,000 KHz.

20. The method of claim 11, wherein the frequency of the electromagnetic signals emitted by the emitter is variable from 300 KHz to 25,000 KHz.

\* \* \* \* \*